United States Patent
Roether et al.

(10) Patent No.: US 7,150,292 B2
(45) Date of Patent: Dec. 19, 2006

(54) ELECTROPNEUMATIC DOUBLE CONTROL VALVE COMPRISING A SEALING ARRANGEMENT

(75) Inventors: Friedbert Roether, Cleebronn (DE); Siegmund Deja, Freiberg (DE); Eberhard Schaffert, Leonberg (DE)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 368 days.

(21) Appl. No.: 10/475,665

(22) PCT Filed: Apr. 26, 2002

(86) PCT No.: PCT/EP02/04628

§ 371 (c)(1),
(2), (4) Date: Jun. 15, 2004

(87) PCT Pub. No.: WO02/102635

PCT Pub. Date: Dec. 27, 2002

(65) Prior Publication Data

US 2004/0231731 A1  Nov. 25, 2004

(30) Foreign Application Priority Data

Apr. 26, 2001 (DE) ................................. 101 20 324

(51) Int. Cl.
*B60T 13/68* (2006.01)
*F16J 15/06* (2006.01)

(52) U.S. Cl. ............................... 137/596.16; 303/118.1

(58) Field of Classification Search ........... 137/596.16; 303/118.1, DIG. 10

See application file for complete search history.

(56) References Cited

U.S. PATENT DOCUMENTS 2,754,840 A * 7/1956 Hicks, Jr. ................. 137/454.6

(Continued)

FOREIGN PATENT DOCUMENTS

DE 2627166 12/1977

(Continued)

*Primary Examiner*—Eric Keasel
*Assistant Examiner*—Craig Price
(74) *Attorney, Agent, or Firm*—Crowell & Moring LLP

(57) ABSTRACT

Electropneumatic double regulating valve for an air-operated vehicle brake system, which is disposed centrally on a wheel axle, equipped with two brakes, with a common relay valve housing (1), in which is integrated for each brake an assigned regulating valve unit, which comprises for valve actuation a control piston, which can be axially adjusted and is disposed inside an assigned control chamber (3a, 3b) and which is driven with a control pressure by way of an electromagnetic pilot valve assembly, housed in an adjacent pilot valve housing, for independent axial adjustment, whereby the pilot valve housing is connected detachably to the relay valve housing (1) by way of a sealing arrangement that lies in-between, whereby the sealing arrangement is designed as one-piece and comprises two sealing ring segments (5a, 5b), which are in essence ring-shaped and are assigned to one control chamber (3a, 3b) each and which are connected together by means of several footbridges (6a to 6c), which are molded on in-between and which are separated from each other in such a manner between the two sealing ring segments (5a, 5b) that an elastic deformation of the footbridges (6a to 6c) results in a defined compensation of the tolerance of the relative position of both sealing ring segments (5a, 5b) in the connecting plane between the pilot valve housing and the relay valve housing (1).

36 Claims, 2 Drawing Sheets

U.S. PATENT DOCUMENTS

| | | | | |
|---|---|---|---|---|
| 2,825,362 | A | * 3/1958 | Hicks, Jr. | 137/596.16 |
| 3,982,795 | A | 9/1976 | Gruener | 303/52 |
| 5,540,452 | A | 7/1996 | Belter | 277/235 B |
| 5,947,483 | A | 9/1999 | Bruemmer et al. | 277/592 |
| 6,048,041 | A | 4/2000 | Mueller et al. | 303/119.2 |

FOREIGN PATENT DOCUMENTS

| | | |
|---|---|---|
| DE | 19531597 A1 | 3/1996 |
| DE | 19535235 A1 | 3/1997 |
| DE | 19605562 A1 | 8/1997 |
| DE | 19935979 A1 | 4/2001 |

* cited by examiner

ELECTROPNEUMATIC DOUBLE CONTROL VALVE COMPRISING A SEALING ARRANGEMENT

The present application is an International Patent Application No. PCT/EP02/04628, filed Apr. 26, 2002, designating the United States of America and published in German as WO 02/102635, the entire disclosure of which is incorporated herein by reference. Priority is claimed based on Federal Republic of Germany Patent Application No. 101 20 324.1, filed Apr. 26, 2001.

BACKGROUND AND SUMMARY OF THE INVENTION

The invention relates to an electropneumatic double regulating valve for an air-operated vehicle brake system.

The electropneumatic double regulating valve of the present invention is disposed centrally on a wheel axle, equipped with two brakes, with a common relay valve housing, in which is integrated for each brake an assigned regulating valve unit, which comprises for valve actuation a control piston, which can be axially adjusted and is disposed inside an assigned control chamber and which is driven with a control pressure by way of an electromagnetic pilot valve assembly, housed in an adjacent pilot valve housing, for independent axial adjustment, whereby the pilot valve housing is connected detachably to a relay valve housing by way of a sealing arrangement that lies in-between. In particular the present invention relates to a special configuration of this sealing arrangement.

A generic regulating valve is installed inside an air brake system of a vehicle, in order to correct a brake pressure in accordance with the desired braking effect. For this purpose a brake line, issuing from the regulating valve, is usually connected to a brake cylinder on the vehicle wheel. Said brake cylinder produces the brake force, required to brake the vehicle wheel, for a disk or drum brake attached to said wheel. The desired pressure value for the electropneumatic regulating valve can be specified both electrically and pneumatically. However, the pneumatic drive is usually used only for safety in the case that the electric drive fails.

Such an electropneumatic regulating valve is known from the DE 196 05 562 A1. The regulating valve exhibits an internal control piston, which has a large area and is housed inside a control chamber, disposed in the relay valve housing. The control piston separates the control chamber from an opposing working chamber. On the side of the working chamber a coaxial hollow pin, which serves to actuate an adjacent valve seat assembly, is formed on the control piston. The valve seat assembly switches, by means of an axial adjustment of a spring-stressed valve tube, the compressed air flow between an external brake line connection, a feed pressure connection, as well as a venting port. The control chamber is actuated by means of a pilot valve assembly with a control pressure, which acts on a control piston. The pilot valve assembly comprises here two electropneumatic pilot valves, which affect, by means of a coordinated flow around the integrated electric coils, an increase, hold or decrease in the control pressure inside the control chamber, which produces a working pressure for the brake cylinder on the opposite side of the control piston. The pilot valve housing is connected detachably to the relay valve housing by means of a sealing ring, which seals the working chamber in the direction of the atmosphere.

In addition to the above described embodiment of an electropneumatic regulating valve with a single integrated regulating valve unit, the background art also discloses double regulating valves, wherein two regulating valve units are integrated into a common relay valve housing. This configuration is usually used for rear axles of motor vehicles, where a central arrangement on the frame is possible. In this respect the double regulating valve actuates both brakes, assigned to the wheels of the wheel axles.

In casting the common relay valve housing and also the pilot valve housing connected thereto, there is the problem that the exact relative position of both adjacent control chambers cannot be reliably guaranteed. In addition to this casting-induced housing tolerance, the sealing rings that are used are also subject to a tolerance. Consequently the result can be an unfavorable chain of tolerances, so that the tightness between the relay valve housing and the pilot valve housing is not always guaranteed. In addition, individual sealing rings are often forgotten during manual assembly so that the resulting cost of reworking is high.

Therefore, an object of the present invention is to further improve an electropneumatic double regulating valve of the above described kind to the effect that a simple to assemble sealing arrangement is found that guarantees a reliable seal between the relay valve housing and the pilot valve housing.

The problem is solved starting from an electropneumatic double regulating valve disposed centrally on a wheel axle equipped with two brakes, with a common relay valve housing containing a control piston for each brake, each control piston being axially adjustable and driven with a control pressure by way of an electromagnetic pilot valve assembly housed in an adjacent pilot valve housing, whereby the pilot valve housing is connected detachably to the relay valve housing by way of a sealing arrangement that lies in-between, The problem is solved in one embodiment of the invention, by a one-piece sealing arrangement, comprising two sealing ring segments, which are in essence ring-shaped and are assigned to one control chamber each and which are connected together by means of several footbridges, which are molded on in-between and which are separated from each other in such a manner between the two sealing ring segments that an elastic deformation of the footbridges results in a defined compensation of the tolerance of the relative position of both sealing ring segments in the connecting plane between the pilot valve housing and the relay valve housing.

An advantage of the inventive sealing arrangement lies in the fact that, owing to the individual sealing components being one piece, they cannot be forgotten during assembly. In addition, the one piece design of the sealing arrangement offers ideal conditions for automating the assembly process. The flexibility in spacing the two sealing ring segments makes it easy to compensate for the casting-induced tolerances at the relay valve housing and/or the pilot valve housing. The invention makes it possible to compensate for the tolerances with the elastically flexible footbridges. In this manner the tolerances can be balanced without hardly any force.

According to another embodiment of the invention, at least one of the footbridges is designed relatively rigid and at least one of the footbridges, arranged separately on the opposite side, is designed relatively elastic so that the tolerance is balanced by adjusting the angle of the two sealing ring segments with respect to each other. The result of the rigidly designed footbridge is an easy to manipulate sealing arrangement, which is relatively stable in its one-piece form, whereby the elastic footbridge compensates for the tolerance.

Preferably the footbridges are designed in the shape of an outwardly oriented arch in order to facilitate the deformation. In addition, the footbridges can be formed with a round to oval cross section in order to avoid twisting during deformation.

According to another embodiment of the invention, the two adjacent footbridges can serve together with the neighboring arch members of the sealing ring segments to seal a pressure medium channel running between the pilot valve housing and the relay valve housing. Such a pressure medium channel can be provided, for example, to provide feed pressure from the feed pressure connection at the relay valve housing for the pilot valves, housed in the pilot valve housing. To seal this pressure medium channel, there is no need to provide a separate sealing element.

To guarantee adequate shape stability for the sealing arrangement, the two sealing ring segments, made of an elastic material, and the rigid footbridges can be provided with an internal reinforcing insert, made of a rigid material, like steel, aluminum, or plastic.

Preferably the sealing ring segments comprise a main sealing segment, extending radially in the connecting plane between the pilot valve housing and the relay valve housing, and an external radial sealing segment for a static seal of the housing as well as an internal radial sealing segment for a dynamic seal of the control piston. In addition, in the area of the main sealing segment at least one point on the periphery of the sealing ring segment can exhibit a passage for a valve-internal pressure medium channel, running between the relay valve housing and the pilot valve housing. Such a passage can also be used as a holder for a pressure compensating element, integrated into the sealing arrangement. The pressure compensating element is provided to balance the pressure with the atmosphere for valve-internal areas of the pilot valve housing that are not used as the pressure chamber.

Other objects, advantages and novel features of the present invention will become apparent from the following detailed description of the invention when considered in conjunction with the accompanying drawings.

DETAILED DESCRIPTION

Figure 1:
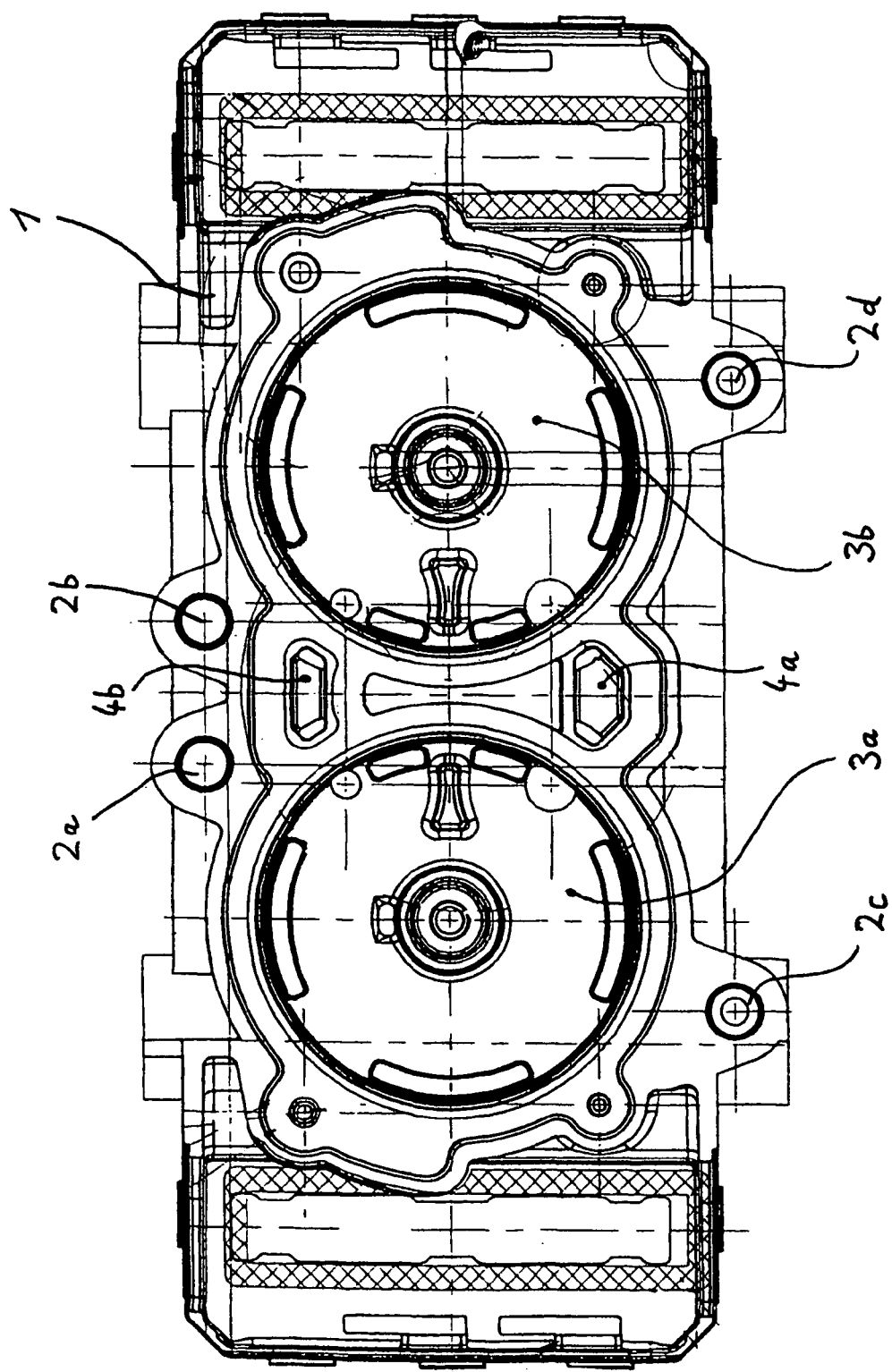
FIG. 1 is a top view of a relay valve housing of a double regulating valve in accordance with an embodiment of the invention.

According to FIG. 1, an electropneumatic double regulating valve includes a relay valve housing 1, which is connected to a pilot valve housing (not illustrated here). The contact surface of the pilot valve housing is designed to correspond to the relay valve housing 1 along the line of a conventional half of the housing and is screwed by way of diverse boreholes 2a–2d to the relay valve housing 1. Inside the relay valve housing 1 there are two axis-parallel control chambers 3a, 3b, in which there are control pistons (also not shown here in detail) to actuate the valve along the line of a pre-controlled seat valve. The control piston is actuated by way of a pilot valve assembly, which is housed in the pilot valve housing, and which comprises individual, electrically switched solenoid valves. Between the two control chambers 3a and 3b there are two pressure medium channels 4a, 4b, which run between the relay valve housing 1 and the pilot valve housing and which serve to guide the valve-internal compressed air between the pilot valve housing and the relay valve housing 1. In the face sided area of the relay valve housing 1, going around the two control chambers 3a, 3b and the two valve-internal pressure medium channels 4a, 4b, there is a sealing arrangement that enables a sealing connection between the relay valve housing 1 and the pilot valve housing.

Figure 2:
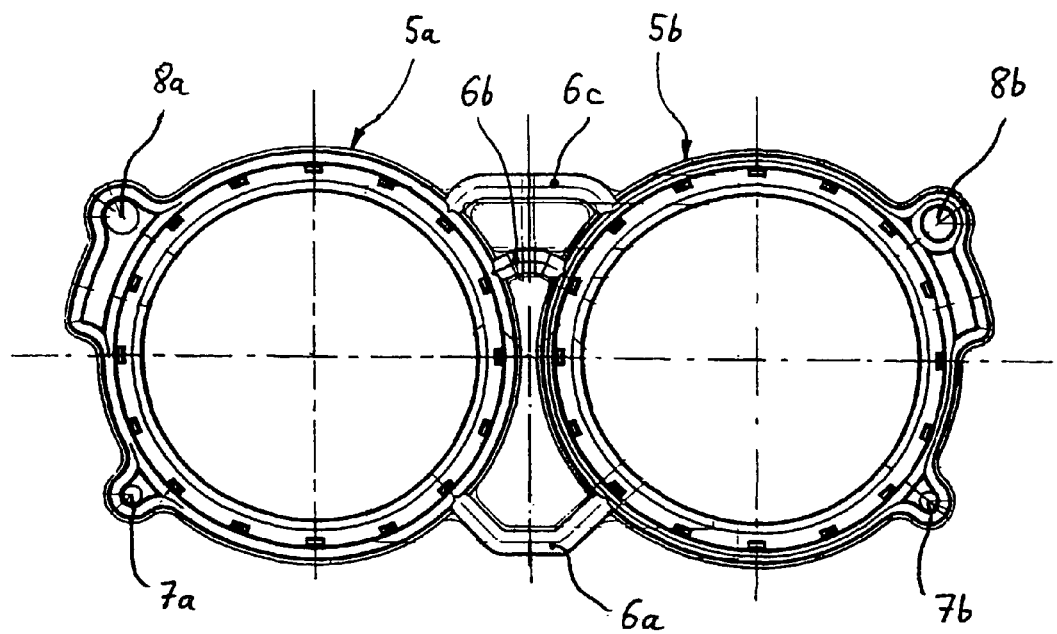
FIG. 2 is a top view of a sealing arrangement, used in the relay valve housing, according to the embodiment of the invention in FIG. 1.

According to FIG. 2, this sealing arrangement is formed by two sealing ring segments 5a, 5b, each of which is assigned to a control chamber (not illustrated here). Both sealing ring segments 5a, 5b are connected together by means of three molded-on footbridges 6a–6c. In this respect the footbridge 6a is designed relatively elastic, whereas the two opposite, separately arranged footbridges 6b and 6c are relatively rigid. As a consequence, the compensation for the tolerances targeted with this sealing arrangement is possible by adjusting the angle of the two sealing ring segments 5a, 5b with respect to each other. The two neighboring footbridges 6b and 6c serve together with the adjacent arch members of the sealing ring segments 5a and 5b to seal the medium channel 4b (not shown in this figure), which runs between the pilot valve housing and the relay valve housing. The other pressure medium channel 4a is sealed through the interaction of the footbridges 6a and 6b in connection with the adjacent arch members of the sealing ring segments 5a and 5b. In the periphery of the sealing ring segments 5a, 5b there are diverse passage 7a, 7b, in order to guarantee a sealed connection of the valve-internal pressure medium channels, running between the relay valve housing and the pilot valve housing. A pressure compensating element 8a, 8b is cast into two such passages, in order to provide a protected pressure compensation with the atmosphere for valve-internal areas of the pilot valve housing that are not used as the pressure chamber. Since the pressure compensating elements are integrated into the sealing arrangement, there is no need for a separate assembly in a corresponding housing segment.

Figure 3:
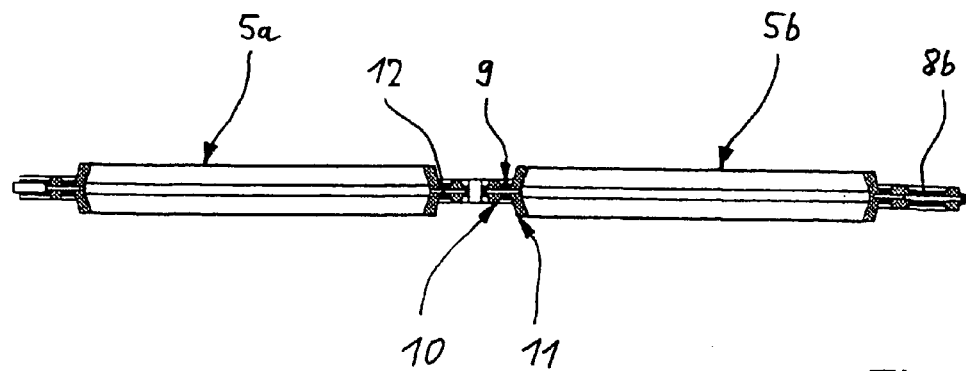
FIG. 3 is a longitudinal view of the sealing arrangement, according to the embodiment of the invention in FIG. 2.

As evident from FIG. 3, each sealing ring segment 5a, 5b comprises a main sealing segment 9, which extends radially in the connecting plane between the pilot valve housing and the relay valve housing 1 and to which is molded an external radial sealing segment 10 for a static seal of the housing as well as an internal radial sealing segment 11 for a dynamic seal of the control piston. Furthermore, a reinforcing insert 12, made of a rigid material, is cast into the sealing ring segments 5a, 5b, in order to guarantee the shape stability of the sealing arrangement.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof. For example, the invention is in particular not limited to the number and function of the passages, provided in the area of the sealing ring segments, for sealing the various valve-internal pressure medium channels, running next to the two control chambers.

What is claimed is:

1. Electropneumatic double regulating valve for an air-operated vehicle brake system, which is disposed centrally on a wheel axle, equipped with two brakes, with a common relay valve housing, in which is integrated for each brake a respective regulating valve unit, which comprises for valve actuation a control piston, which can be axially adjusted and is disposed inside a respective control chamber and which is driven with a control pressure by way of an electromagnetic pilot valve assembly, housed in an adjacent pilot valve housing, for independent axial adjustment, whereby the pilot valve housing is connected detachably to the relay valve housing with a sealing arrangement that lies in-between, wherein the sealing arrangement is designed as one-piece and comprises two circular sealing ring segments which are connected together by a plurality of footbridges, which are molded in-between said two circular sealing ring segments and which are separated from each other in such a manner between the two sealing ring segments that an elastic deformation of the footbridges results in a defined compensation of a tolerance of a relative position of both sealing ring segments in a connecting plane between the pilot valve housing and the relay valve housing.

2. Electropneumatic double regulating valve, as claimed in claim 1, wherein at least one footbridge on a first side of the sealing arrangement is designed relatively rigid and at least one footbridge, arranged separately on the an opposite side of the sealing arrangement, is designed relatively elastic so that the tolerance is balanced by adjusting the angle of the two sealing ring segments with respect to each other.

3. Electropneumatic double regulating valve, as claimed in claim 2, wherein two adjacent footbridges serve together with the neighboring arch members of the sealing ring segments to seal a pressure medium channel between the pilot valve housing and the relay valve housing.

4. Electropneumatic double regulating valve, as claimed in claim 3, wherein the two sealing ring segments, made of an elastic material, as well as the rigid footbridges are provided with an internal reinforcing insert, made of a rigid material.

5. Electropneumatic double regulating valve, as claimed in claim 2, wherein the two sealing ring segments, made of an elastic material, as well as the rigid footbridges are provided with an internal reinforcing insert, made of a rigid material.

6. Electropneumatic double regulating valve, as claimed in claim 5, wherein the reinforcing insert is made of steel, aluminum, brass or a rigid plastic.

7. Electropneumatic double regulating valve, as claimed in claim 2, wherein the sealing ring segments comprise a main sealing segment, extending radially in the connecting plane between the pilot valve housing and the relay valve housing, which includes an external radial sealing segment for a static seal of the housing as well as an internal radial sealing segment for a dynamic seal of the control piston.

8. Electropneumatic double regulating valve, as claimed in claim 7, wherein in the area of the main sealing segment at at least one point on the periphery of the sealing ring segment includes a passage to permit passage of a valve-internal pressure medium channel, running from the relay valve housing to the pilot valve housing.

9. Electropneumatic double regulating valve, as claimed in claim 7, wherein in the area of the main sealing segment a pressure compensating element is placed on at least one point on the periphery of the sealing ring segment to provide a protected pressure compensation with the atmosphere for the areas of the pilot valve housing that are not used as the pressure chamber.

10. Electropneumatic double regulating valve, as claimed in claim 1, wherein the plurality of footbridges have an outwardly oriented arch shape in order to facilitate the deformation.

11. Electropneumatic double regulating valve, as claimed in claim 10, wherein two adjacent footbridges serve together with the neighboring arch members of the sealing ring segments to seal a pressure medium channel between the pilot valve housing and the relay valve housing.

12. Electropneumatic double regulating valve, as claimed in claim 1, wherein the plurality of footbridges include one of a round and an oval cross section in order to avoid twisting during deformation.

13. Electropneumatic double regulating valve, as claimed in claim 1, wherein two adjacent footbridges serve together with the neighboring arch members of the sealing ring segments to seal a pressure medium channel between the pilot valve housing and the relay valve housing.

14. Electropneumatic double regulating valve, as claimed in claim 13, wherein the two sealing ring segments, made of an elastic material, as well as the rigid footbridges are provided with an internal reinforcing insert, made of a rigid material.

15. Electropneumatic double regulating valve, as claimed in claim 1, wherein two adjacent footbridges serve together with the neighboring arch members of the sealing ring segments to seal a pressure medium channel between the pilot valve housing and the relay valve housing.

16. Electropneumatic double regulating valve, as claimed in claim 1, wherein the two sealing ring segments, made of an elastic material, as well as the rigid footbridges are provided with an internal reinforcing insert, made of a rigid material.

17. Electropneumatic double regulating valve, as claimed in claim 16, wherein the reinforcing insert is made of steel, aluminum, brass or a rigid plastic.

18. Electropneumatic double regulating valve, as claimed in claim 1, wherein the sealing ring segments comprise a main sealing segment, extending radially in the connecting plane between the pilot valve housing and the relay valve housing, which includes an external radial sealing segment for a static seal of the housing as well as an internal radial sealing segment for a dynamic seal of the control piston.

19. Electropneumatic double regulating valve, as claimed in claim 18, wherein in the area of the main sealing segment at at least one point on the periphery of the sealing ring segment includes a passage to permit passage of a valve-internal pressure medium channel, running from the relay valve housing to the pilot valve housing.

20. Electropneumatic double regulating valve, as claimed in claim 18, wherein in the area of the main sealing segment a pressure compensating element is placed on at least one point on the periphery of the sealing ring segment to provide a protected pressure compensation with the atmosphere for the areas of the pilot valve housing that are not used as the pressure chamber.

21. An electropneumatic double regulating valve for an air-operated vehicle brake system disposed centrally on a wheel axle equipped with two brakes, comprising:

a common relay valve housing, including for each brake, a regulating valve unit and an axially adjustable control piston for valve actuation disposed inside a control chamber; and a common pilot valve housing connected detachably to the relay valve housing, including for each brake an electromagnetic pilot valve assembly which drives its respective control piston for independent axial adjustment, wherein a sealing arrangement is disposed between the relay valve housing and the pilot valve housing when connected to one another, and the sealing arrangement is one-piece and includes two circular sealing ring segments linked by a plurality of footbridges, the footbridges being deformable to compensate for a tolerance of a relative position of the sealing ring segments when the pilot valve housing and the relay valve housing are connected to one another.

22. The electropneumatic double regulating valve of claim 21, wherein at least one footbridge on a first side of the sealing arrangement is more rigid than another of the plurality of footbridges disposed on an opposite side of the sealing arrangement, and the tolerance is compensated by adjusting the angle of the two sealing ring segments with respect to each other.

23. The electropneumatic double regulating valve of claim 22, wherein a sealed pressure medium channel between the pilot valve housing and the relay valve housing is defined by two adjacent footbridges and the sealing ring segments between the two adjacent footbridges.

24. The electropneumatic double regulating valve of claim 22, wherein the two sealing ring segments and footbridges are provided with a rigid internal reinforcing insert.

25. The electropneumatic double regulating valve of claim 24, wherein the reinforcing insert is made from at least one of steel, aluminum, brass and a rigid plastic.

26. The electropneumatic double regulating valve of claim 22, wherein the sealing ring segments each includes a double-walled seal arrangement wherein when the relay valve housing and the pilot valve housing are connected, an internal radial sealing segment seals its respective control chamber from an external radial sealing segment radially surrounding the internal radial sealing element.

27. The electropneumatic double regulating valve of claim 26, wherein a valve-internal pressure medium channel from the relay valve housing to the pilot valve housing passes through at least one passage between the internal radial sealing segment and the external radial sealing segment.

28. The electropneumatic double regulating valve of claim 26, wherein a pressure compensating element, which provides a protected pressure compensation with the atmosphere for non-pressurized areas of the pilot valve housing, passes between the internal radial sealing segment and the external radial sealing segment.

29. The electropneumatic double regulating valve of claim 21, wherein the plurality of footbridges are curved away from a center of the sealing arrangement.

30. The electropneumatic double regulating valve of claim 21, wherein the plurality of footbridges include one of a round and an oval cross section in order to avoid twisting during deformation.

31. The electropneumatic double regulating valve of claim 21, wherein a sealed pressure medium channel between the pilot valve housing and the relay valve housing is defined by two adjacent footbridges and the sealing ring segments between the two adjacent footbridges.

32. The electropneumatic double regulating valve of claim 21, wherein the two sealing ring segments and footbridges are provided with a rigid internal reinforcing insert.

33. The electropneumatic double regulating valve of claim 32, wherein the reinforcing insert is made from at least one of steel, aluminum, brass and a rigid plastic.

34. The electropneumatic double regulating valve of claim 21, wherein the sealing ring segments each includes a double-walled seal arrangement wherein when the relay valve housing and the pilot valve housing are connected, an internal radial sealing segment seals its respective control chamber from an external radial sealing segment radially surrounding the internal radial sealing element.

35. The electropneumatic double regulating valve of claim 34, wherein a valve-internal pressure medium channel from the relay valve housing to the pilot valve housing passes through at least one passage between the internal radial sealing segment and the external radial sealing segment.

36. The electropneumatic double regulating valve of claim 34, wherein a pressure compensating element, which provides a protected pressure compensation with the atmosphere for non-pressurized areas of the pilot valve housing, passes between the internal radial sealing segment and the external radial sealing segment.

* * * * *